United States Patent [19]

Engle

[11] Patent Number: 4,772,049

[45] Date of Patent: Sep. 20, 1988

[54] MULTIPLE PLY DOCUMENT

[75] Inventor: John R. Engle, Beavercreek, Ohio

[73] Assignee: NCR Corporation, Dayton, Ohio

[21] Appl. No.: 59,092

[22] Filed: Jun. 1, 1987

[51] Int. Cl.$^4$ .......................... B41L 1/24; B41L 1/20; B41L 5/04; B41L 3/02

[52] U.S. Cl. .............................. 282/9 R; 282/11.5 A; 282/21 R; 282/24 R

[58] Field of Search ...................... 281/5; 282/2, 4, 6, 282/8 R, 9 R, 10, 11.5 A, 21 R, 22 R, 24 R; 229/69; 235/453, 462, 473, 476, 487, 494

[56] References Cited

U.S. PATENT DOCUMENTS

| | | | |
|---|---|---|---|
| 2,286,094 | 6/1942 | Hollingsworth | 282/11.5 R |
| 2,614,865 | 10/1952 | Shennan | 282/22 R |
| 3,854,654 | 12/1974 | Van Malderghem | 282/11.5 A |
| 3,916,051 | 10/1975 | Wakeman | 282/24 R |
| 4,136,895 | 1/1979 | McKinzie et al. | 282/9 R |
| 4,168,851 | 9/1979 | Halse | 282/11.5 A |
| 4,191,402 | 3/1980 | Michlin . | |
| 4,311,325 | 1/1982 | Steidinger | 282/11.5 A |
| 4,343,492 | 8/1982 | Fitzgibbons . | |
| 4,403,793 | 9/1983 | McCormick et al. | 282/9 R |
| 4,475,747 | 10/1984 | Ashby | 282/21 R |
| 4,614,362 | 9/1986 | Breen et al. | 282/9 R |

FOREIGN PATENT DOCUMENTS 755985  4/1967  Canada .............................. 282/22 R

OTHER PUBLICATIONS

Engle et al., U.S. Ser. No. 06/930,823, filed Nov. 14, 1986.

Primary Examiner—E. R. Kazenske
Assistant Examiner—Paul M. Heyrana, Sr.
Attorney, Agent, or Firm—Wilbert Hawk, Jr.; Albert L. Sessler, Jr.; George J. Muckenthaler

[57] ABSTRACT

A multiple ply document for receiving recording information includes a top ply having a machine readable code printed thereon, one or more intermediate plies and a bottom ply secured together by means of a line of adhesive along one edge thereof. The top and intermediate plies are secured to respective overlying and underlying plies by means of staggered lines of adhesive to secure the piles at another area of the document. The top and intermediate plies also each include a line of weakening slightly below the respective line of adhesive to permit removal of a portion of the first ply and of the middle plies and leaving an upper portion of the top and intermediate plies on the document.

16 Claims, 2 Drawing Sheets

FIG. 1
FIG. 2
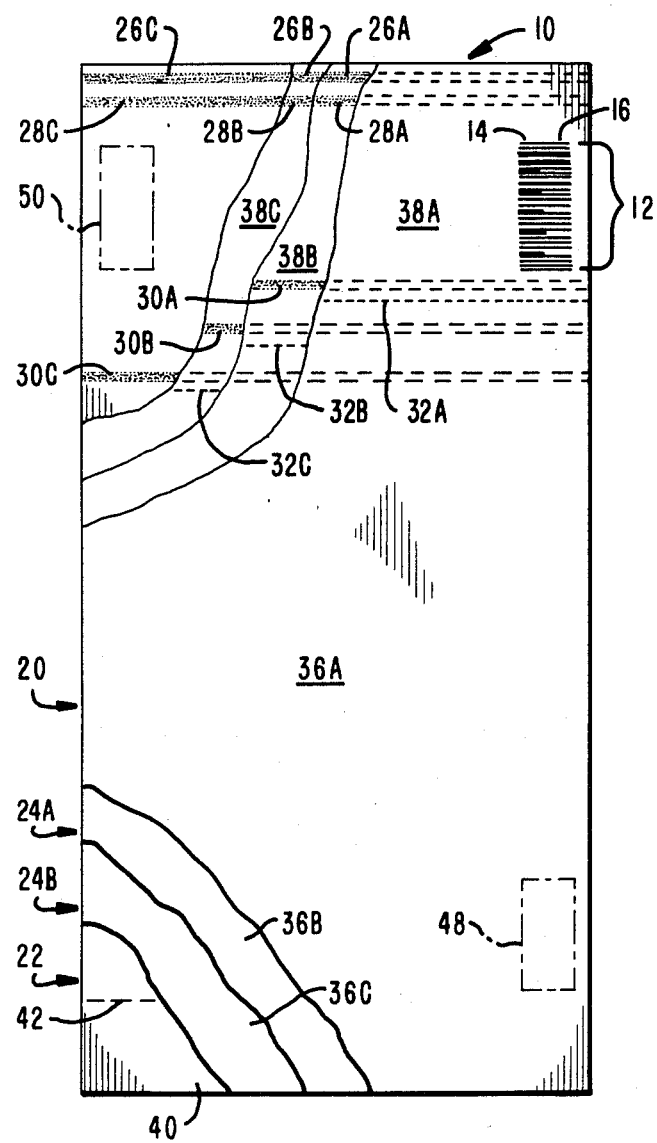
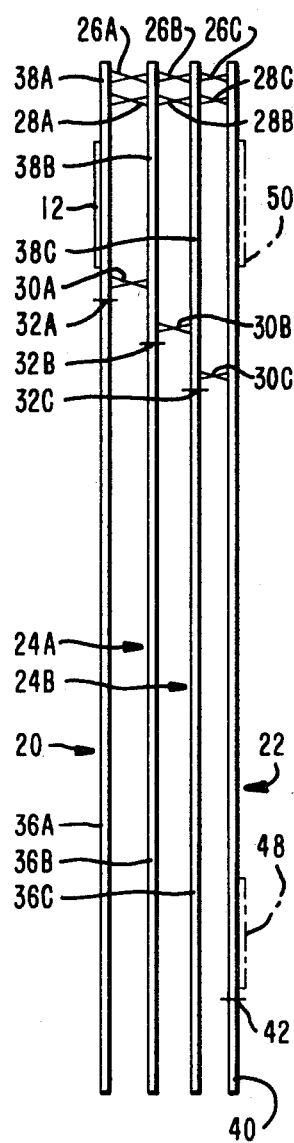

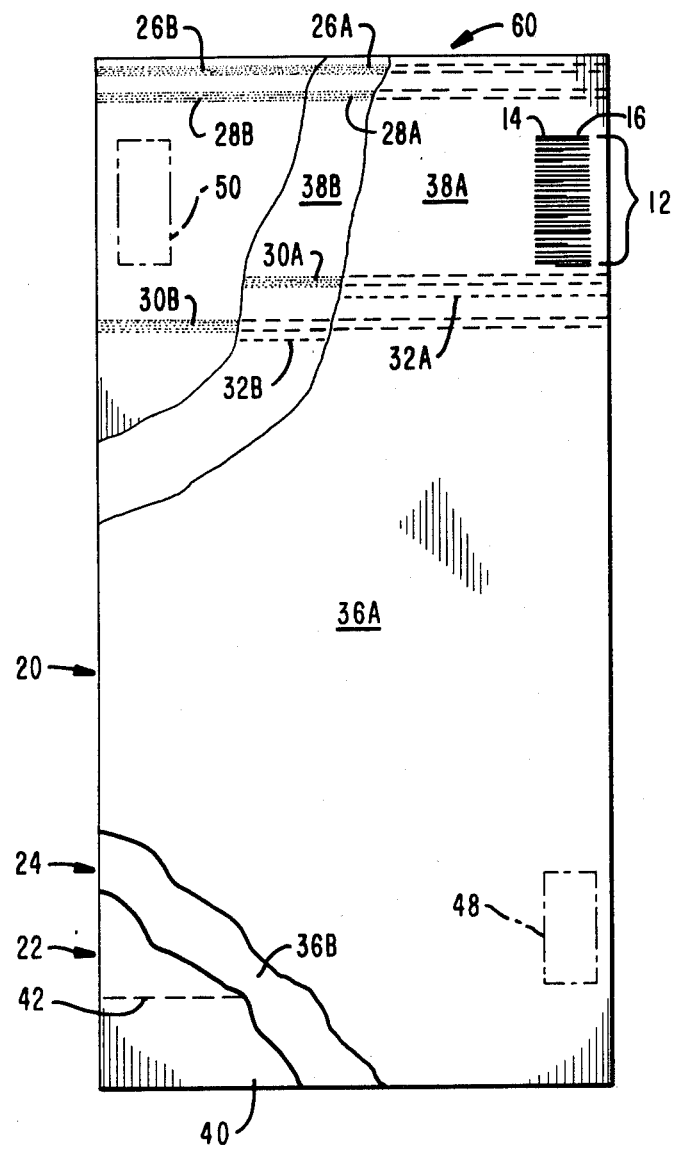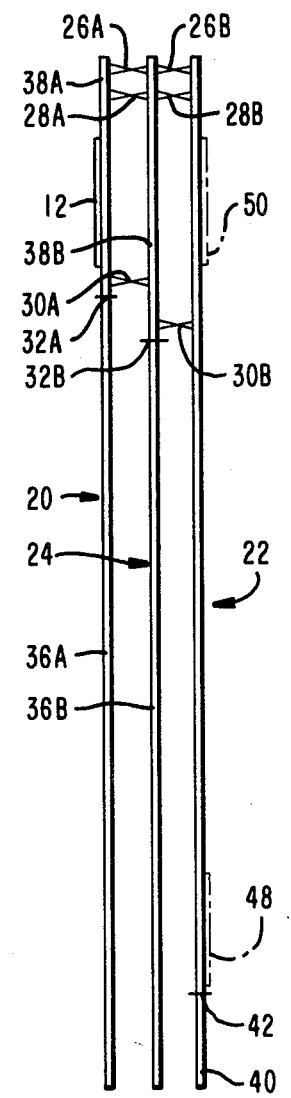

MULTIPLE PLY DOCUMENT

BACKGROUND OF THE INVENTION

In present-day data processing systems, the use of bar code symbols on labels or articles is well known as a means for acquiring data at a point of sale or other business transaction. The bar code symbol on the article or label is read by a scanning apparatus to provide data such as the identification and price of the article. Of course, additional data may be required of the system in the overall arrangement depending on the complexity of the business operation.

The bar code symbol is used on documents such as guest checks for hotels, dining facilities or the like where the information concerning items of food and/or drinks is entered and recorded on the check and the bar code symbol is read by a reader for processing the information.

While the format and arrangement of printed information on the guest check varies for each business establishment, certain information is desirable to provide a record of the transactions. The printed information on the guest check may include the name and address of the business, the server, table, number of persons, time, date or other like information.

It is also known that the guest checks may comprise a single sheet or ply on which is printed the essential information, with a bar code symbol being printed in an appropriate machine readable location. A portion of the check generally is easily removable along a line of perforations for issuing to the guest and which portion includes a record of the service and transaction.

The guest check may comprise a back or bottom ply on which is printed the essential information along with a printed bar code symbol, and a front or top ply which is secured to the back or bottom ply by means of a line of adhesive or the like. The front or top ply may extend over a portion or all of the back or bottom ply and is removable therefrom by the server or cashier for the desired use.

Another arrangement comprises a multiple ply guest check which includes the printed information including the bar code symbol on all plies and wherein the plies are secured together by means of a line of adhesive along one edge of the guest check.

Representative documentation relating to multiple ply business forms includes U.S. Pat. No. 4,191,402, issued to I. R. Michlin on Mar. 4, 1980, which discloses a form having a face sheet, a back sheet and a plurality of intermediate sheets which are secured together along one side edge and wherein the intermediate sheets are made of a greater width than the face and back sheets.

U.S. Pat. No. 4,343,492, issued to G. W. Fitzgibbons on Aug. 10, 1982, discloses first and second superimposed plies of paper each having an information receiving portion. One ply is completely slit adjacent one edge and an easily releasable glue line secures the two plies together adjacent the slit.

U.S. application Ser. No. 930,823, filed Nov. 14, 1986, on the invention of J. R. Engle et al. discloses a multiple ply document which includes a front ply and a back ply secured together at two locations and a middle ply extending to a location short of the two locations and secured to the back ply.

SUMMARY OF THE INVENTION

The present invention relates to multiple ply documents for use in business establishments. More particularly, the present invention relates to guest checks on which is printed certain information and which includes space for recording information in addition to space occupied by a printed bar code symbol.

The multiple ply guest check includes a back or bottom ply of a weight which is sufficient to generally support itself and which is known as or termed a heavyweight ply. A front or top ply of lighter weight or a lightweight ply of the same size as the back ply is secured thereto along one edge so as to leave three free edges. The front ply has a line of weakening spaced from the one edge so as to enable removal of a lower portion of the front ply. At least one middle or intermediate ply is secured by means of a line of glue to the front ply and to the back ply along the one edge and also is secured in the vicinity of the line of weakening and is easily removable from the back ply. As a modification, each of a plurality of intermediate plies may be secured by means of a line of glue along the one edge and in the vicinity of the lines of weakening to be easily removable from an adjacent ply. The lines of glue and the associated lines of weakening are positioned in staggered manner and are spaced from the one edge.

A bar code symbol is printed in one corner of the top ply and is positioned to be read by a reader for processing of the guest checks. The portion of the front ply on which is printed the bar code symbol along with a middle ply portion are secured to the back ply in the vicinity of the lines of weakening so as to remain with the back ply when either the top ply and/or the middle ply less the respective portions is removed from the guest check back ply.

In view of the above discussion, a principal object of the present invention is to provide a multiple ply document printed for machine reading and having portions of the respective plies removable from the document.

Another object of the present invention is to provide a multiple ply guest check having a bar code symbol printed on one ply thereof, which bar code symbol remains on the one ply of the guest check when portions of other plies are removed from the guest check.

An additional object of the present invention is to provide a multiple ply guest check having a ply with one portion on which is printed a bar code symbol and having an additional portion of said ply removable from the guest check leaving the one portion with the printed bar code symbol.

A further object of the present invention is to provide a multiple ply guest check having front, middle and back plies of substantially the same size and secured to one another along one edge, the front ply having a first portion with a bar code symbol printed therein, and such guest check having one or more removable intermediate ply portions along with a second portion of the front ply removable from the guest check.

Additional advantages and features of the present invention will become apparent and fully understood from a reading of the following description taken together with the annexed drawing.

BRIEF DESCRIPTION OF THE DRAWING

FIG. 1 is a top or front plan view of a preferred arrangement for a guest check incorporating the subject matter of the present invention;

FIG. 2 is a side view of the guest check with the several plies being separated in exaggerated manner to show the construction;

FIG. 3 is a top or front plan view of a modified guest check incorporating the subject matter of the present invention; and FIG. 4 is a side view of the modified guest check with the several plies being separated to show the construction.

DESCRIPTION OF THE PREFERRED EMBODIMENT

Referring to FIG. 1 of the drawing, there is shown a top or front view of a record member 10 such as a guest check which is used or issued by a motel or hotel or other business establishment and on which customer charges are recorded. Upon registration at the motel or hotel, or upon being provided a service or items of consumption, the customer is assigned a guest check 10 on which is printed a bar code symbol 12. The bar code symbol 12 comprises a left hand data channel portion 14 including a plurality of lines of different widths spaced to provide machine readable indicia, such as an account number, and a right hand portion 16 that is used as a clocking channel, the overall arrangement forming a personal account number assigned to the customer and readable to process the various transactions.

A preferred bar code design and application thereof are disclosed in U.S. Pat. Nos. Des. 261,007, issued to B. E. Passer et al. on Sept. 29, 1981; 4,259,569, issued to B. E. Passer et al. on Mar. 31, 1981; and 4,283,622, issued to B. E. Passer et al. on Aug. 11, 1981, all assigned to the assignee of the present invention.

Any charges that are incurred by the customer are entered on the guest check 10 by inserting the check into the printing mechanism of a terminal or like device (not shown) and entering the amount of the charge into the printing mechanism through a keyboard in a manner that is well-known in the art. A drive member in the terminal device drives the guest check 10 to a position adjacent the printing members of the printing mechanism which prints the amount of the charge. During an initial movement of the guest check 10 into the terminal device, a reader or like sensing member reads the bar code symbol 12 and enables the terminal device to identify the customer's account number so that the amount being printed is identified as belonging to such customer. After verifying the account number, the terminal device notifies the operator to enter the amount of the charge into the keyboard, after which the printing operation is performed. At check-out time, the total amount of the charge or charges on the guest check 10 is added and printed for payment by the customer.

The guest check 10 comprises a plurality of plies which are formed and arranged in a unique manner to provide an advantageous document for use in business operations. The guest check 10 includes a top or front ply 20 of relatively lightweight paper and of rectangular form, and a bottom or back ply 22 of relatively heavyweight paper and also of rectangular form and essentially corresponding in size with the front ply. At least one middle or intermediate ply of relatively lightweight paper (there being two intermediate plies 24A and 24B in the preferred arrangement), also of rectangular shape and essentially corresponding in size with the top and bottom plies 20 and 22, is provided for the guest check, as illustrated in FIG. 2. The top, middle and bottom plies 20, 24A, 24B and 22 are full length plies with removable portions, as described below.

The top or front ply 20 is CB (coated back) carbonless transfer paper which is secured to the intermediate ply 24A by means of a double line or spaced lines 26A and 28A of adhesive along and between the upper edges of the two plies. The intermediate ply 24A is secured to the intermediate ply 24B by means of a double line or spaced lines 26B and 28B of adhesive along and between the upper edges of the two plies. And, the intermediate ply 24B is secured to the back ply 22 by means of a double line or spaced lines 26C and 28C of adhesive along and between the upper edges of the two plies. A line 30A of adhesive is positioned at a distance down from the first lines 26A and 28A and thereby secures the top ply 20 and the middle ply 24A at a second area of attachment. A line 30B of adhesive is positioned at a further distance from the lines 26B and 28B and thereby secures the middle ply 24A and the middle ply 24B at a second area of attachment. And, a line 30C of adhesive is positioned at a still further distance from the lines 26C and 28C and thereby secures the middle ply 24B and the back ply 22 at a second area of attachment.

A line of weakening 32A comprising a fine line of perforations is provided in the front ply 20 adjacent and slightly below the line 30A of adhesive, as illustrated in FIG. 2. A line of weakening 32B comprising a fine line of perforations is provided in the middle ply 24A adjacent and slightly below the line 30B of adhesive. And, a line of weakening 32C comprising a fine line of perforations is provided in the middle ply 24B adjacent and slightly below the line 30C of adhesive. The fine-perforated line 32A provides for easy removal of a lower portion 36A of the front ply 20 and leaves a substantially smooth edge on the remaining upper portion 38A of the front ply. Likewise, the fine-perforated line 32B provides for easy removal of a lower portion 36B of the middle ply 24A and leaves a substantially smooth edge on the remaining upper portion 38B of the middle ply 24A. And, the line 32C provides for easy removal of a lower portion 36C of the middle ply 24B and leaves a smooth edge on the remaining upper portion 38C of the middle ply 24B.

The back or bottom ply 22 is CF (coated front) carbonless transfer paper which is of one piece construction except for a lower portion 40 which is removable along a line of weakening 42 comprising a line of perforations to provide a stub portion 40 of the transaction. The stub portion 40 may be used by the customer as a record of the transaction or of the total of the transactions (if more than one).

The middle or intermediate plies 24A and 24B are CFB (coated front and back) carbonless transfer paper and are secured to the respective front and back plies by means of the lines of adhesive positioned at the respective locations and in the arrangement as shown in FIG. 2. The adhesive used along the several lines is a permanent type glue to secure the various plies of the guest check 10. While FIGS. 1 and 2 show the parts in exaggerated manner, it is advantageous to maintain the lines 32A, 32B and 32C of weakening as close as possible to the glue lines 30A, 30B and 30C to minimize catching or snagging of the edges during machine-reading operations. Depending upon the orientation of the guest check 10 when inserted into the reading apparatus, alternate locations, as at 48 or 50 on the back side of the guest check 10, may be provided for the bar code symbol 12.

FIGS. 3 and 4 illustrate a modification of the invention in providing a guest check 60 incorporating similar construction as that of FIGS. 1 and 2 and utilizing the same parts or elements thereof. While the four-part guest check 10 is the preferred arrangement, the modified guest check 60 includes a front ply 20, an intermediate ply 24 and a back ply 22. The guest check 60 includes the printed bar code 12 in the upper right corner thereof.

The front ply 20 is secured to the middle ply 24 by means of glue lines 26A and 28A along the upper edges of the two plies and the middle ply 24 is secured to the back ply 22 by glue lines 26B and 28B. A glue line 30A is positioned at a distance down from the lines 26A and 28A to secure the plies 20 and 24 at a second area, and a glue line 30B is positioned at a further distance from the lines 26B and 28B to secure plies 24 and 22 at a second area.

A line of weakening 32A is provided in the front ply 20 just below the glue line 30A to enable removal of the lower portion 36A of the front ply and thereby leaving an upper portion 38A. A line of weakening 32B is provided in the middle ply 24 just below the glue line 30B to enable removal of a lower portion 36B of the middle ply and thereby leaving an upper portion 38B. The back ply 22 is of one piece construction except for a lower portion 40 which is removable along a line of weakening 42 to provide a stub portion of the transaction. The guest check 60 may also include alternate locations, as at 48 or 50, of the printed bar code 12.

While a preferred arrangement of the present invention includes the use of CF, CB, and CFB paper for the several plies, it, of course, is within the scope of this invention to provide plain paper for the plies and to use carbon paper therebetween for transmitting the information to the successive plies.

The multiple ply forms 10 and 60 are constructed in collated manner by applying the several glue lines, die cutting the lines of perforation, and letterpress crash imprinting the bar code symbol on the portion 38A of the top ply 20.

When a person uses this multiple ply form, items of data or information can be written on the face of the top or front ply 20 along with machine printing of desired data or information. An image of such writing and/or printing appears on the middle ply 24 (FIGS. 3 and 4) or middle plies 24A and 24B (FIGS. 1 and 2) and on the back or bottom ply 22. The guest check is then inserted into the terminal for machine reading of the bar code symbol 12 to effect a transaction. The lower portion 36A of the top ply 20 can be removed along the fine perforated line 32A, leaving the upper portion 38A with the bar code symbol 12 thereon. After one or more additional transactions, the middle ply 24 can be removed along the line of perforations 32B without disturbing the upper portion 38B of the middle ply 24. And, after one or more further transactions in the case of using the four-part check of FIGS. 1 and 2, the middle plies 24A and 24B can be removed along the lines 32B and 32C without disturbing the upper portions 38B and 38C of the middle plies. The remaining bottom ply 22 then can be inserted into the terminal for reading the bar code symbol 12 on the top ply 20. The structure of the guest check 10 permits the bar code symbol 12 to be read with one, two, three or more plies on the check.

It is thus seen that herein shown and described is a multiple ply document 10 for receiving data or information, which comprises a front ply 20 on which is printed a bar code symbol 12, a back ply 22 of comparable size and secured to the front ply, and one or more intermediate plies 24 of the same size as the front and back plies and secured to the respective overlying and underlying plies. Of course, the one or more intermediate plies 24 may be provided to form or make up a unit set type guest check. A portion of the front ply 20 can be removed along a line of weakening 32A and the one or more intermediate plies 24 can be removed along the respective lines of weakening. The upper portion 38A of the front ply 20 on which is printed the bar code symbol 12 remains with the document 10 and allows the form to be used and the bar code symbol 12 to be read with one, two, three, or all four plies.

The printing of the bar code symbol 12 only on the portion 38A of the top ply 20 eliminates any problems which may be caused by paper dust collecting on the steel bar code numbering wheels of the printing mechanism if the printing was performed on the CFB and the CF sheets of paper. The paper dust on the numbering wheels could result in smudging of the bar code symbol 12. The printing of the bar code symbol 12 only on the top ply 20 also eliminates any problem of "see-through" reading in the case where symbols are printed on more than one ply and it is seen that any shifting of the plies could cause a slight advance or delay in reading the proper bar code with a resulting error in the transaction.

The guest checks 10 and 60 of the present invention are provided with a permanent type glue along the lines 26, 28 and 30 for securing the respective plies in the two different areas. The fine perforated lines 32 leave a smooth edge when the lower portion 36A of the top ply 20 is removed, and the bar code symbol 12 need be printed only one time while enabling reading thereof when one, two, three or more plies are present.

The document of the present invention enables the accomplishment of the objects and advantages mentioned above, and while a preferred embodiment and a modification thereof have been disclosed herein, other variations may occur to those skilled in the art. It is contemplated that all such variations not departing from the spirit and scope of the invention hereof are to be construed in accordance with the following claims.

I claim:
1. A business form comprising a
first ply having information printed thereon and forming the front of the business form, a
second ply of substantially the same size as the first ply and forming the back of the business form, and
at least one third ply of substantially the same size as the first ply and the second ply, the third ply being secured to the first ply and to the second ply by first continuous securing means along one edge thereof and by second continuous securing means at a location spaced from said first continuous securing means and comprising a first line of adhesive securing said first ply and said third ply and comprising a second line of adhesive securing said second ply and said third ply, said first line of adhesive and said second line of adhesive being arranged in displaced relationship from each other at said location between the first ply and the third ply and between the third ply and the second ply, the first ply and the third ply each having a line of weakening adjacent the first line of adhesive and the second line of adhesive of said second continuous securing means permitting removal of a portion of the first ply and of a portion of said at least one third ply, the selective removal of the first ply portion and of said at least one third ply portion leaving another portion of the first ply with the information thereon remaining with the form.

2. The business form of claim 1 wherein the first ply is of one weight material and the second ply is of a heavier weight material.

3. The business form of claim 1 wherein the information printed on the first ply includes a bar code symbol.

4. The business form of claim 1 wherein each of the first and the second continuous securing means comprises a line of adhesive.

5. The business form of claim 1 wherein the second ply includes a line of weakening spaced from one edge thereof permitting removal of a portion of the second ply.

6. The business form of claim 1 wherein the second ply includes information printed on the back side thereof, the printed information on the back side including a bar code symbol.

7. The business form of claim 1 wherein the first ply includes a coating on the back side thereof for transferring record information, the third ply includes a coating on the front side thereof for receiving the record information and a coating on the back side thereof for transferring the record information, and the second ply includes a coating on the front side thereof for receiving the record information.

8. The business form of claim 1 wherein the first continuous securing means comprises double lines of adhesive adjacent the edges of the first, second and third plies, and the second continuous securing means comprises a single line of adhesive spaced from the double lines of adhesive and securing the first and the third plies at a second area of attachment and a single line of adhesive spaced further from the double lines of adhesive than the first mentioned single line of adhesive for securing the second and the third plies.

9. The business form of claim 1 wherein the second continuous securing means comprises a first line of adhesive securing the first and the third plies at a location spaced from the first continuous securing means and a comprises second line of adhesive securing the second and the third plies at a location spaced further from the first continuous securing means than said first mentioned location, and said first ply line of weakening being adjacent said first line of adhesive and said third ply line of weakening being adjacent said second line of adhesive and staggered relative to said first ply line of weakening to enable portions of said first and said third plies to be removed from said business form.

10. A business form comprising a front ply having information printed thereon, a back ply of substantially the same size as the front ply, and at least one intermediate ply of substantially the same size as the front ply and the back ply, the intermediate ply being secured to the front ply and to the back ply by first securing means along one edge thereof and by second securing means spaced from said first securing means and arranged in staggered position between the front ply and the intermediate ply and between the intermediate ply and the back ply, the front ply and the intermediate ply each having a line of weakening adjacent the second securing means permitting removal of a lower portion of the front ply and of a lower portion of said at least one intermediate ply, the selective removal of the lower portion of the front ply and of the lower portion of said at least one intermediate ply leaving the upper portion of the front ply with the printed information thereon remaining with the back ply.

11. The business form of claim 10 wherein the front ply is of one weight material and the back ply is of a heavier weight material.

12. The business form of claim 10 wherein the information printed on the front ply includes a bar code symbol.

13. The business form of claim 10 wherein the first and the second securing means each comprises a line of adhesive.

14. The business form of claim 10 wherein the back ply includes a line of weakening spaced from one edge thereof permitting removal of a lower portion of the back ply.

15. The business form of claim 10 wherein the first securing means comprises a double lines of continuous adhesive and the second securing means comprises a single line of continuous adhesive between said front ply and said intermediate ply and a single line of continuous adhesive between the intermediate ply and the back ply.

16. The business form of claim 10 wherein the second securing means comprises a first line of adhesive securing the front ply and the intermediate ply at a location spaced from the first securing means and comprises a second line of adhesive securing the intermediate ply and the back ply at a location spaced further from the first securing means than the first mentioned location, and said front ply line of weakening being adjacent said first line of adhesive and said intermediate ply line of weakening being adjacent said second line of adhesive and displaced further from the first securing means than the front ply line of weakening.

* * * * *